United States Patent [19]

Robley et al.

[11] Patent Number: 5,061,061

[45] Date of Patent: Oct. 29, 1991

[54] FRONT PROJECTION COMPOSITE PHOTOGRAPHY SYSTEM COMBINING STAGED ACTION WITH TWO PROJECTED IMAGES

[75] Inventors: Les P. Robley, Los Angeles; John W. Eppolito, Pasadena, both of Calif.

[73] Assignee: Introvision International, Inc., Hollywood, Calif.

[21] Appl. No.: 210,141

[22] Filed: Jun. 14, 1988

Related U.S. Application Data

[63] Continuation of Ser. No. 880,105, Jun. 30, 1986, abandoned, which is a continuation of Ser. No. 93,150, Nov. 13, 1979, abandoned.

[51] Int. Cl.$^5$ .............................................. A63J 5/00
[52] U.S. Cl. ...................................... 352/89; 352/47; 352/48
[58] Field of Search ........................ 352/47, 48, 88, 89

[56] References Cited

U.S. PATENT DOCUMENTS

| | | | |
|---|---|---|---|
| 1,278,117 | 9/1918 | Dawley | 352/48 |
| 1,669,407 | 5/1928 | Artigue | 352/88 |
| 1,669,963 | 5/1928 | Youngblood | 352/48 |
| 1,690,039 | 10/1928 | Schufftan | 352/47 |
| 1,742,680 | 1/1930 | Artigue | 352/88 |
| 1,764,490 | 6/1930 | Artigue | 352/48 |
| 1,945,926 | 2/1934 | Tolhurst | 352/47 |
| 2,147,030 | 2/1939 | Haskin | 352/89 |
| 2,615,364 | 10/1952 | Tondreau | 354/219 |
| 2,727,427 | 12/1955 | Jenkins | 352/89 |
| 2,727,429 | 12/1955 | Jenkins | 352/89 |
| 3,036,496 | 5/1962 | Frederick et al. | 352/89 |
| 3,366,438 | 1/1968 | Hartman | 352/89 |
| 4,018,519 | 4/1977 | Clapp | 352/89 |
| 4,067,026 | 1/1978 | Pappanikolaou | 352/89 |

FOREIGN PATENT DOCUMENTS

| | | | |
|---|---|---|---|
| 768029 | 5/1934 | France | 352/89 |
| 260574 | 1/1928 | United Kingdom | 352/47 |

OTHER PUBLICATIONS

American Cinematographer, Jul. 1962, pp. 428, 430, 432, 433, 434.
American Cinematographer, Jun. 1968, pp. 420, 421, 422, 441, 445, 456.
American Cinematographer, Nov. 1968, pp. 864–866, 878, 879, 887.
American Cinematographer, Mar. 1970, pp. 242–245, 259.
American Cinematographer, Apr. 1962, pp. 228, 229, 242–245.
American Cinematographer, Jul. 1969, pp. 688–693, 696.
"Special Effects Cinematography", by Raymond Fielding Hastings House Publishers, New York, 1977, pp. 321–345.

Primary Examiner—Monroe H. Hayes
Attorney, Agent, or Firm—Noel F. Heal

[57] ABSTRACT

A front projection composite photography system using a pair of perpendicular reflex screens combines two projected background scenes with a staged scene in a single camera shot for a versatile range of special effects. Complementary mattes are used outside the projectors and camera for either soft or hard edged merging into overall projected background scenes. A camera-projector housing cabinet includes all elements compactly except for stage reflex screens which are externally located in a small studio room. A lens permits use of a small secondary reflex screen used with a larger primary screen behind a movable stage setup. The camera, two projectors and respective associated three half mirrored transparent beam splitters provide registration adjustments for registration of all composite picture portions for immediate observation through the camera viewfinder so the film will be properly aligned and so that a complex composite picture may be produced with a single camera take.

A separate matte camera is also provided in the cabinet for producing mattes concurrently with the composite film production for further compositing.

This system therefore optically positions a staged scene into a projected scene by using the depth characteristics of the camera and perspective introduced by movable stage and relative camera axis positions of the background projections on the two reflex screens as modified by appropriate mattes.

16 Claims, 2 Drawing Sheets

FRONT PROJECTION COMPOSITE PHOTOGRAPHY SYSTEM COMBINING STAGED ACTION WITH TWO PROJECTED IMAGES

This application is a continuation of application Ser. No. 06/880,105, filed June 30, 1986, now abandoned which was a continuation of application Ser. No. 06/093,150, filed Nov. 13, 1979 now abandoned.

TECHNICAL FIELD

This invention relates to the field of composite photography and more particularly it relates to front projection reflex screen composite photography wherein a staged scene is combined with one or more projected background scenes.

BACKGROUND ART

Methods for the production of composite images have been known and used for many years. But some prior systems have had certain shortcomings in one or more of the following particulars: Inaccuracy, including lack of exact registration; the presence of fringes or ghosts surrounding an inserted object; objectionable multiplicity of operations and time delays necessary to produce the final results, including the necessity of using a multiplicity of films and takes to reach the desired composite. Multiple operations and various film stocks, of course, decrease the prospects of final accuracy, and printing to and from a multiplicity of films also has a tendency to decrease the distinctness and sharpness of the images, and to coarsen the apparent emulsion grain of the final photograph. Also realistic merging of staged scenes into background with proper perspective, shadows, etc. has not been feasible.

Typical composite photography background art using at least in part a reflex front projection screen is found in U.S. Pat. Nos. 2,727,427—W. F. Jenkins, Dec. 20, 1955; 1,636,112—Schüfftan, Jul. 19, 1927 and 2,857,806—Shuftan, Oct. 28, 1958; and 3,366,438—Hartman, Jan. 30, 1968. These systems do provide for achievement of simple merging of two or more scenes. However, they have limited flexibility in achieving a realistic perspective and various types of merging techniques with a single camera take which can for example isolate and burn a tree, etc., nor do they effectively use mattes and may require traveling mattes bipacked in cameras or projectors.

Thus, special types of traveling mattes such as "bipacks" are used in the prior art where a camera or projector need process a film and a matte together and where separate photographic steps are necessary to achieve the composite picture, with all the attendant problems of exactly matching position, registration, camera weave, film grain, etc. This sort of art is represented by U.S. Pat. No. 2,870,672—F. W. Gage et al., Jan. 27, 1959. Also the final scene not visible for combined effects and registration of all requisite elements until after multiple photography which does not permit immediate registration and viewing of a scene before take to assure it is proper.

Also back projection techniques, such as used in the Schuftan patents, are not desirable because of washout, lens problems and difficulties in registery.

None of the prior art systems are able to use camera perspective effectively in placing staged action within the environment of variable and changing projected background scenery. Few systems have the flexibility to handle by one camera shot such requisites as the substitution of one segment of a general background scene with another, as might happen when a tree located in the background scene is burned, etc. Nor do the prior art systems in general have the capability of packaging of the entire camera-projector equipment in a compact cabinet for use in a small room studio with external reflex type front projection screens. Furthermore, the ghosting and fringing caused by improper matte matching and improper shadow relationships are defects of the prior art.

It is among the objects of this invention to overcome such difficulties as these and to provide a method and apparatus whereby such composite pictures may be produced in a comparatively simple manner, with few operations, with the greatest accuracy, and with the final production of a most realistic photographic representation.

DISCLOSURE OF THE INVENTION

Since the basic front projection set-up of this invention has, for all intents and purposes, the same features as that of a gigantic optical printer, it can lend itself to the most curious and useful kinds of composite manipulations. One of these is accomplished by having actors or models pass into view on a staged scene and move behind objects which are part of the already photographed background scene. This allows for ultimate interaction and three-dimensional depth between foreground and background subjects, and thus, reinforces the illusion of reality to the photographic image. There are a number of ways of achieving this effect, but none so flexible as the dual reflex screen system of front projection provided by this invention. To better understand the invention, it is compared with equivalent background processes.

For example, suppose a scene were required of an actor strolling in between the pillars of some exotic palace in Italy, but he was unavailable to shoot within that locale, or a full production crew were not permitted on the premises. If it were imperative that the actor's face be discernable on the screen, some form of composite trickery would have to be enforced in order to achieve the desired result. The production might turn to the blue screen technique described in the R. J. Pomeroy U.S. Pat. No. 1,673,019—June 12, 1928. However, some form of large blue screen pillars would have to be erected in front of the camera in order to mask off their movements behind the real pillars. These would be incredibly difficult to align with what is present in the background scene without some form of frame cut arrangement in the camera, and even then it would take some time to set up. The composite would not be available for viewing for weeks on end until the final accurate marrying up of film were achieved. And even a perfect blending of blue screen pillars would not hide the inherent matte line fringe around the subject that has long been associated with blue screen.

Another technique might be to use normal front screen with either a real foreground set constructed in front of a reflex screen or reflex cutouts substituted in its place such as used in Jenkins above-mentioned U.S. Pat. No. 2,727,427. The real set would be difficult to build and match properly to the projected background scene, and most of the time it ends up looking exactly like what it is: a process shot! The reflex cutout, however, conjurs up some problems of its own. Superseding the simplicity and flexibility of this method, is the cost factor.

Reflex sheeting is expensive, and inasmuch as there is a limit to the depth of field of the projected image, so there is a limit to the distance from the screen at which such cutouts can be placed without throwing the projected image out of focus. The inversesquare law of light would affect the brightness of the image as well to introduce visible intensity differences if the cutout were placed too far from the background screen.

To avoid reflex cutouts, a black matte can be used rather than reflex cutouts in the manner described in the G. B. Pollock patent U.S. Pat. No. 1,737,021—Nov. 26, 1929 or R. J. Pomeroy patent U.S. Pat. No. 1,818,354—Aug. 11, 1931. Then, after shooting is completed, the film is rewound in the camera to the exact starting point to film the pillars with the surrounding area all matted out.

However, whenever the camera is rewound back, there is always the possibility of accidentally moving it, which would cause the two image components to be mis-matched. In addition, the camera used might not possess an adequate registration system resulting in a visible matte line jiggle in the finished product. The problem is compounded by the fact that if there is any live action movement in the mattedout portion that the actor must react to, close interaction in movements between the actor on stage and the action in the projected scene is virtually impossible. Time would be spent in the re-photographing stage, as well.

Now the system of this invention would alleviate all the above problems and best aid the production of a realistic composite. Thus, an auxiliary reflex screen with a lens is used with complementary mattes in front of each screen to correspond in position with the placement of the pillars in the projected background scene. Also the stage is movable to insert the actors anywhere in the perspective of the background scene.

Thus, the actor can walk behind the pillar and virtually anywhere in the background scene blocked out by a matte, providing that he maintains the proper scale relationship to images in the projected background scene, which can be accomplished by movement of the stage. Of course, the actor doesn't exceed the recommended distances from the screen dictated by the halo gradient in all front projection.

One advantage of the system of this invention over that of other special effects devices is that everything in the composite (including two projected images on reflex screens at right angles, the stage and mattes) is visible to the camera operator for alignment and registration. These under the older methods were not assembled for view until the film was processed. Likewise, there is no problem with foreground and background image light balance, since each can be varied independently on their respective screens and dubbed at the time of shooting to be suitable. There is also no problem with matte lines, or jiggle caused by poor registration, since the final composite can be viewed and corrected at once through the camera viewfinder, and no rewinding of the film is necessary. Time is also saved, since everything is accomplished in one take and any intermittent weave in the projected scene is transmitted to both screens at the same time. Finally, and most important of all, the composite is ready to be viewed in dailies the following day; no weeks of optical printing required.

A number of other effects can be created with the dual screen system of this invention. Since one is dealing with front projection in general, the backgrounds can take the form of anything that is able to be put on celluloid: real locations such as the one described, miniature sets, paintings, cartoon drawings; the only limiting factor being that of the projection scenes themselves. The small screen could be removed and models, artwork, colored lights, etc. could be substituted in its place since the auxiliary lens changes the focus of the camera-projector apparatus to a closer, more workable position on the stage. This would be utilized if one wanted to alter something in the existing plate or add a pleasing color effect (i.e. inserting flames into unlit candle holders in the plate or adding a laser beam to an otherwise dormant laser cannon).

When using the dual screen system, smaller front projection screens behind the actor can be made to look quite large. For example, a 20 foot screen could be made to look like a 50 foot screen, or even larger depending upon the focal length lens used and distance on the stage. This is due to the fact that the entire 35 mm frame is imaged through the auxiliary lens onto the small reflex screen located only eight feet away. As long as the actor stays limited to his area in front of the 20 foot screen, this section can then be matted into the entire image on the smaller reflex screen with the aid of soft-edged mattes, and the actor appears to be in front of a 50 foot screen when in actuality he is limited to his 20 foot space. Using the same idea, the actor can be made to appear standing on a high precipice, when he is in reality only a few feet off the ground standing on wooden platforms. Such camera perspective is not available in prior art systems.

With all these advantages the entire system can have the optical system compactly mounted in a small cabinet, and can be used in a small studio room with external reflex screens. The camera is equipped with a nodal pan and tilt head with mechanical adjustments for entrance pupil position changes during zoom lens shots. The projector is fitted with a 6000 watt xenon light source with color correction already added for normal 3200 Kelvin color temperature, and an attenuator has been added on the light source for stopping the light down to any desired setting. This advantage is three-fold: (1) Balance between actor and screen is achieved with little effort and no color temperature change is visible. (2) The projector can now hold a still frame for animation and alignment purposes with no apparent buckling of the film and no image degradation caused by filtration. (3) The attenuator can be coupled to motion effects to counteract any changes in screen brightness. A solid cabinet base is equipped with leveling screws and the whole unit can be wheeled into position by one person.

The camera is fitted for increment movements in XYZ coordinates for alignment of the camera lens pupil to that of the projector lens. The auxiliary projector lenses are also equipped with the same movement, plus a tilt axis for removing reflections cast into the camera lens. There is also an iris adjustment on the lens for varying the intensity of light that hits the small reflex screen.

These features permit use of camera perspective employing the laws of perspective where an actor is raised to an appropriate height which is necessary to insert him into the picture, thereby making him an integral part of the projected scene. This is an essential point that the prior art fails to consider. Thus, the insertion of a real stage floor raised in perspective can likewise be placed into the picture, thereby allowing actors to cast shadows, and furniture set pieces can be added. The system by means of matting techniques can place front projected walls and other elements around this real floor.

For scenes requiring coordinated motion between the staged scene and a background scene, actors can be moved on conveyor belts, treadmills and/or turntables to correspond with the movement in the background scene. If an actor were to move on a treadmill at the speed of the scene being projected such as a slowly moving car, and if said actor were to be introduced into the picture on the screen, the illusion of movement in the frame would be difficult, if not impossible to be detected as what it really is - an actor in a stationary position walking or running on a treadmill. If the actor were to turn into the picture at the precise pace of the background scene with appropriate matting he then would appear to be walking into or out of the background scene.

If the system camera and stage were to raise or lower or to move in depth, as the case may be, and the projected scene were to do likewise, the actors perspective change would also give the illusion of movement.

All this is achieved by a system of two reflex screens, a primary large screen and an auxiliary smaller one with an intermediate lens to give advantages of better grain, better perspective relative to the primary screen and to reduce system dimensions by reduced screen size and studio dimensions. A single compositing camera views the system including background images from a pair of projectors disposed perpendicularly to introduce prephotographed background scenes on the respective reflex screens disposed perpendicularly. A set of three semi-transparent mirrored surface beam splitter panels having one each associated with the respective camera and projectors, aligns the camera view on both screens and the projected scenes on respective screens. The movable stage is disposed between the primary screen and camera, and the screens and stage are external to a compact cabinet containing the rest of the optical elements in a relatively adjustable relationship permitting exact registration of the various parts of a composite picture. Provision is made for mounting externally to the cabinet, complementary mattes registered on changeable glass plates positioned between the cabinet and the two reflex screens.

Other structure, features, objects and advantages of the invention will be found throughout the following more detailed description and its accompanying drawing and claims.

DESCRIPTION OF A PREFERRED EMBODIMENT

Figure 1:
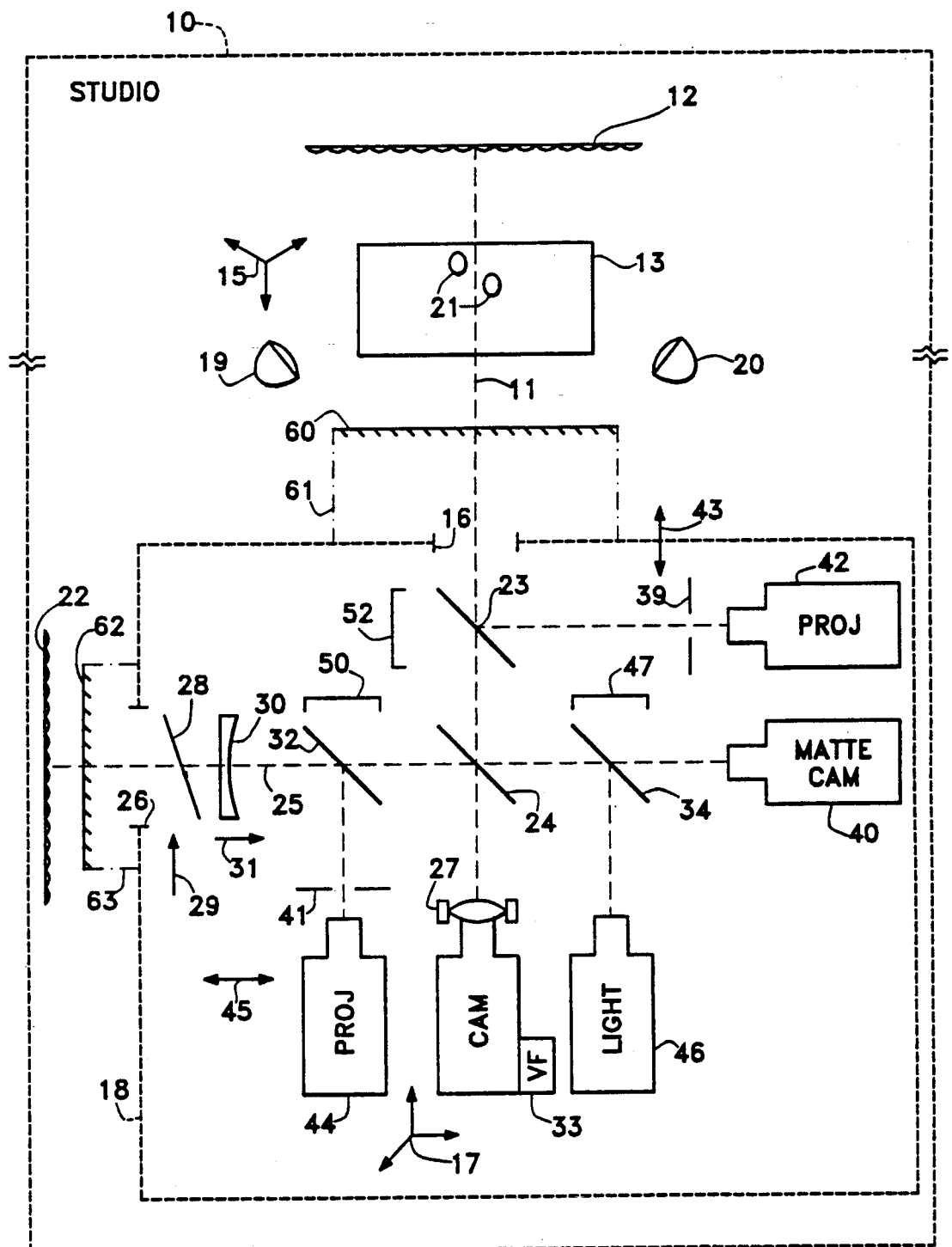
FIG. 1 is a schematic and diagrammatic view of the composite photography system afforded by this invention, wherein the basic photography equipment is contained in a cabinet which views two externally positioned reflex front projection screens located in a small studio room.

A small studio 10 of length great enough to position a large front projection screen 12 (shown with surface texture to indicate that if it is a reflex type screen) and a stage 13 in the focal view of a camera 14 along a line 11 through an aperture 16 located in the optical equipment housing cabinet 18. The line 11 extends from the camera 14 through two half-mirrored transparent plates 23, 24 disposed at 45° angles. Studio lights 19, 20 are provided for the stage 13, which accomodates actors or some other staged scene 21, and are used to set the light of the stage proper for the merge into the background scenery as well as to effect shadows on the stage that appear in the composite.

Also within the studio 10 and external to cabinet 18 is a smaller auxiliary reflex screen 22 mounted perpendicular to screen 12 and located along a line 25 through cabinet aperture 26, along which a filter 28 and lens 30 are disposed at a slight angle from perpendicular to eliminate stray ambient light, and along which three half-mirrored transparent beam splitter plates 32, 24, 34 are disposed at 45° angles.

Each of the beam splitters 23, 24, 32, 34 is associated with a respective camera 14, 40 or projector 42, 44, 46 to respectively receive images from along the two perpendicular lines 11 and 25 through the transparency of plates 23, 24 or 32, 24, 34 or to project images therealong from the mirrored sides of the beam splitter plates 23, 32, 34.

Except for the staged scene, the images respectively received and projected are displayed upon the reflex scenes 12 and 22, thereby given the camera 14 also the capability to composite the images from both reflex screens 12 and 22 by viewing screen 22 from the mirrored side of the beam splitter plate 24.

Since a number of lighted images and light paths are processed in the compact cabinet 18, and stray light reflecting off the cabinet, lenses or beam splitter plates will detract from the faithful reproduction of desired images, blackened light absorbing traps 50, 52 are arranged to absorb all the light passing through the beam splitter plates 23, 32 respectively from projectors 42 and 44. Also light from projector 46 is absorbed by trap 47. In addition, a slight tilt to auxiliary lens 30 and glass mattes 60 and 62 and filter 28, avoids ambient light reflections.

All projectors and cameras have proper lenses arranged to provide the desired focal lengths and fields of view, but specifically the projectors 42, 44 are provided with iris control means 39, 41 to assure that light may be equalized along the respective projected paths so that any composited images seen by camera 14 on both screens 12, 22 may be matched to the same light intensity.

For registering the various elements to be brought together in a composite scene to be filmed by camera 14, some of the relative adjustments of various devices are shown schematically. Thus, the stage 13, or portions of it, is positionable in three dimensions namely laterally and vertically to screen 12, and along line 11, as indicated by the arrow notation 15. Similarly the projectors 42, 44 can be adjusted for path lengths as shown by arrow notation 43, 45 for projection along the paths 11 and 25. Also, since the camera 14 is used for depth perception in this invention the adjustment to different distances along either of the perpendicular axes 11, 24, as well as vertically up and down the primary reflex screen 12, is provided for as indicated by arrows 17. Likewise the lens 30 is adjustable for positioning of screen 22 as shown by arrow 31 and the filter 28 may comprise a polaroid filter with adjustment 29 for modifying the light transfer along axis 25. Any suitable lens 27 may be used on camera 14 for viewing simultaneously the staged scene 13 and screen 12 along the axis 11 and the screen 22 along axis 25. It is most important that the camera 14 have a reflex viewfinder 33 so that the camera operator may align and register each element of the composite picture to be taken before filming.

By use of lens 30, a smaller, lower cost reflex screen 22 may be used and the equipment is usable in a smaller studio room. Thus, a small screen 22 may be used for viewing by camera 14 without the penalty of introducing film grain defects, and with advantages of perspective when compared with large screen 12.

In order to avoid any preloading of film and film processing to provide movable mattes suitable for bipacking in the camera or projector and thereby to simplify making and registration of the composite pictures in this system and to have them available for view immediately in viewfinder 33 rather than to await a film printing process, this invention makes use of external mattes 60, 62 associated with the respective primary screen 12 and auxiliary screen 22. The notation is to show that black cutout mattes, which may be complementary for the two screens, are mounted on glass plates held in a framework indicated by dotted line notation 61, 63 to be positionable relative to the respective cabinet orifices 16, 26 along the axes 11 and 25. The glass plates are registerable in the mounts by means such as registration pins for exact quick replacement in registration, so that mattes may be quickly interchanged for different scenes.

The compact cabinet 18 can also include a matte camera 40 with a projected light source 46 with stray light trapped by trap 47 for light passing through beam splitter plate 34. Conversely a full opaque mirror could be used. The light projected on screen 22 as modified by matte 62 from the mirrored surface of beam splitter plate 34 then is seen by camera 40 and thus a travelling matte can be made as the camera 14 produces a composite picture. However, this subassembly is not essential to the operation of the remainder of the system in preparing composite pictures by camera 14.

In operation this system gives the complete flexibility of being able to composite a staged scene into a projected background and furthermore to do special effects with a portion of the projected background scene such as causing a tree to appear as if it is burning.

In addition, this system gives a depth perception and a realism not heretofore realized with prior art systems. Thus, shadows of actors on stage 13 can be cast so that the shadow effect does not give away the compositing either by being missing or by being unnatural in extent or direction. The lighting 19 and 20 is used for the appropriate development of shadows which will be seen by camera 14 along with the projected images on screens 12 and 22 respectively from projectors 42 and 44.

Also by proper use of the mattes 60, 62 and the depth perception of lens 27 in camera 14, actors can realistically be made to walk into and out of a part of the background scene, such as behind a tree, into a door or over a hill, all with a depth perceptive effect. This matte system permits moving the matte from closer to the cabinet 18 for softer merge fading into the background scene to closer to the screen 12 22 for harder merge with sharp lines and no ghosting.

By use of the movable stage 13 and the camera 14 for perspective, the staged action may be inserted mid-picture relative to the projected image on screen 12 by raising the stage and moving it along line 11 for proper depth, size and perspective. Because of the location of the stage, the small size of screen 22 and large size of screen 12, the typical 20 foot size screen could be made to appear perspectivewise as if it were as large as 50 feet. The matte 60 then masks out the unwanted stagework and any other portion of the picture such as a tree which is required for staging the desired scene. A complement of matte 60 is used as matte 62 so that if the same scene can be projected upon both reflex screens 12 and 22, where the camera 14 composites the two views for a complete picture not masked out by the stagework intruding into the background scene. Projection of the same scene on both reflex screens 12 and 22 can, of course, be accomplished by means of the single projector arrangement shown in FIG. 2 rather than the two projectors 42 and 44 shown in FIG. 1.

By use of two projectors 42, 44 disposed normally to each other (and thus providing a feasible compact arrangement within cabinet 18) and proper mattes, a tree may be shown in a perspective position permitting actors on stage 13 to walk behind it and disappear. Also there is flexibility in filming a scene where the tree is apparently burning by replacing the tree image in one projected view with a burning tree in another projected view, with appropriate use of mattes.

Of course, as further described in the following paragraph, simpler scenes may be achieved by use of only a single projector if desired, but still can be given the depth perspective made possible by the movable stage assembly 13 and the perspective of camera 14. Also different scenes can be projected by the two projectors such as a foreground scene and a background scene.

Figure 2:
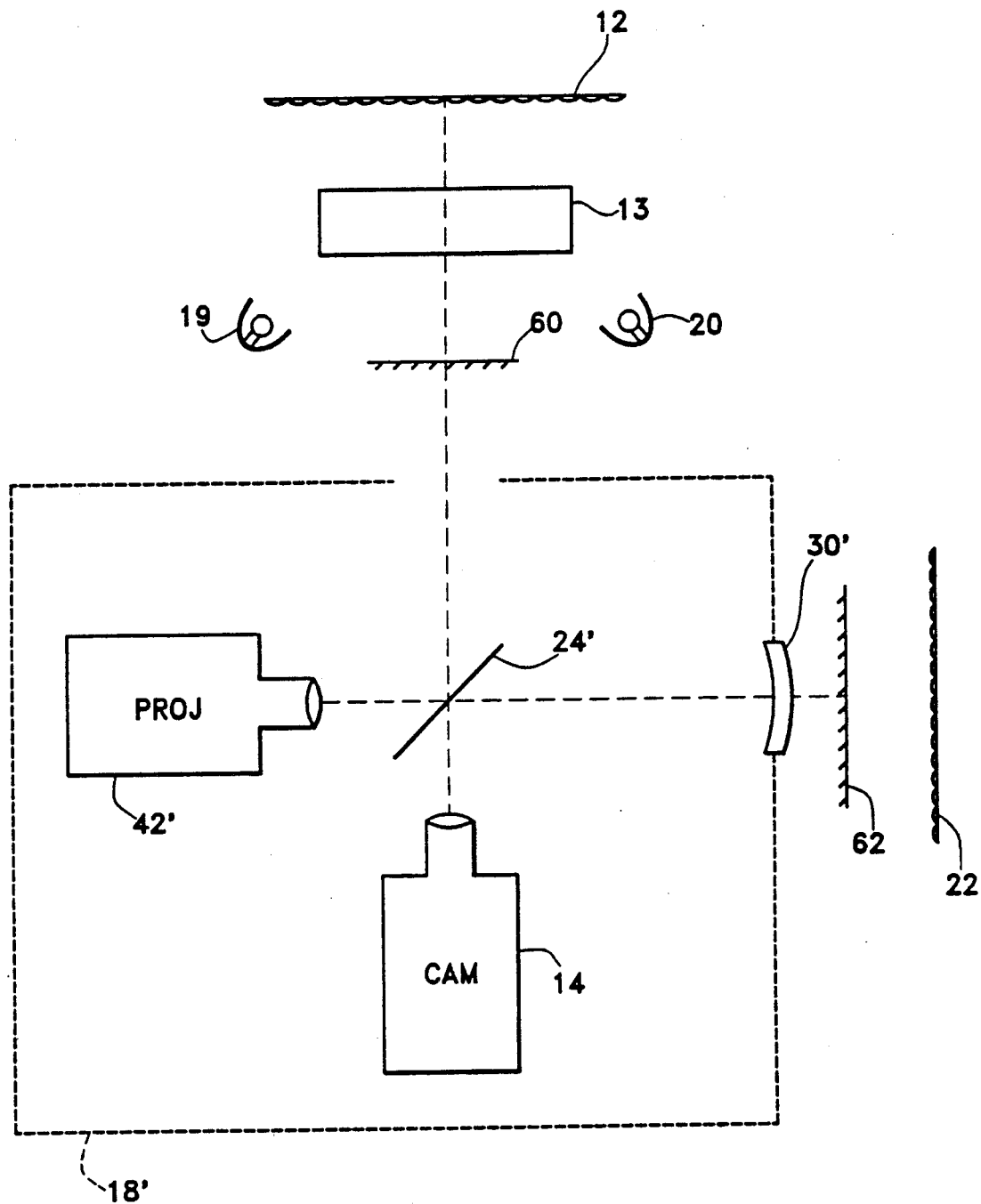
FIG. 2 is a schematic diagrammatic view of a simplified form of the composite photography system, illustrated in FIG. 1.

The single-projector version of the invention shown in FIG. 2 still includes the camera 14, stage 13, and reflex screens 12 and 22. A single projector, indicated by reference numberal 42', is disposed with its optical axis perpendicular to that of the camera 14 and perpendicular to the side reflex screen 22. Projected images from the projector 42' pass first through a beam splitter 24' and thence through a lens 30' to the side reflex screen 22. Light returning from the side reflex screen 22 passes again through the lens 30' and is reflected through 90 degrees at the beam splitter 24', into the camera 14. As in the first-described embodiment, the camera 14 is aligned to receive light reflected from the front reflex screen 12. In this embodiment, however, the image on the front screen 12 is also derived from the single projector 42', after reflection from the beam splitter 24'. Thus, the same image is projected toward the two screens 12 and 22. The mattes 60 and 62, positioned in front of the screens 12 and 22 respectively, are complementary, as previously described with respect to the FIG. 1 embodiment. The projector 42' camera 14, beam splitter 24' and lens 30 are all housed in a compact cabinet 18'.

Having therefore advanced the state of the art with novel apparatus in combination and corresponding novel modes of use, those features believed descriptive of the spirit and nature of the invention are set forth with particularity in the claims.

Industrial Application

A compact photography center in a cabinet manageable by a single person works with a pair of front projection reflex screens and movable stage in a small studio for a wide range of composite photography techniques taken by a single camera viewing on one film two different projected background scenes combined with a staged scene. Complementary mattes are used external to the cameras and projectors to avoid bipacking or travelling mattes. The system provides simplified registration of the various picture components by viewing through the camera viewfinder before filming, and introduces a camera depth perspective feature which permits the staged scene, together with realistic shadows, to be realistically merged into, behind or in front of any part of a projected background scene. Complex composites replacing one object for another such as a burning tree can be readily achieved with a single camera take.

We claim:

1. Apparatus for front projection composite photography of multiple scenes including a staged scene, comprising in combination:
    a pair of reflex front surface reflective flat screens disposed along axes perpendicular to each other,
    a stage for production of live action disposed in front of a primary one of said screens, said stage being movable along three axes to position the live action wholly within the projected images,
    three transparent mirror surfaced beam splitters each disposed at an angle to both said axes and arranged in an array with two of said beam splitters disposed along each of the respective lines perpendicular to the screens,
    a single camera disposed to view along a first of the lines through the transparency of two of said three beam splitters, the stage and the primary screen to produce a composite picture of the action on the stage and any image appearing on the first said screen, and wherein said camera includes means for panning and tilting, and means for zooming with respect to the composite picture, all without changing the desired relationship between the live action and the projected images,
    two projectors disposed to project respectively by means of two of said mirror surfaces background images on both said screens, said camera being further disposed to view by means of the mirror surface of one of a first two of said beam splitters and through the transparency of the third beam splitter the second auxiliary one of said two screens, whereby the camera mirrors and projectors may be aligned for a single composite camera shot merging two projected scenes with a staged scene, and
    a pair of complementary mattes arranged in the projection path between the respective projectors and the screens to modify the respective projected images as seen by the camera so that the camera will view one complete background image scene made up from the two modified images,
    and wherein said complementary mattes are affixed to respective glass plates positioned respectively outside the projectors in the paths of the respective background images from the projector to the respective screens, and positioned relative close to the screens to provide a sharp boundary between portions of the projected images.

2. Apparatus as defined in claim 1 wherein a lens is placed in the projected image path to the auxiliary screen to permit a smaller screen and smaller area for the apparatus, and including a filter in that path for adjusting the light intensity to a level permitting the camera to view both screens with the same light intensity.

3. Apparatus as defined in claim 1 wherein the projectors have iris control means for matching the light intensity of the images on the two screens as viewed by the camera.

4. Apparatus as defined in claim 1 wherein each of the projectors passes an image through the transparency of the respective beam splitters, and including light trap means for the respective beam splitters absorbing any light projected therethrough.

5. Apparatus as defined in claim 1 wherein a second camera for preparing a travelling matte is disposed along the pathway to the auxiliary screen, and is provided with a further beam splitter surface and a light projection source to reflect off the beam splitter mirror and the auxiliary screen back into the camera thereby to provide a picture of that part of the image on that screen that is not masked out by intervening selection means.

6. Apparatus as defined in claim 1, wherein:
    the stage includes structure positioned in front of a bottom portion of the primary screen to position the staged scene in the mid-portion of the background scene projected on the primary screen,
    both projectors project a similar background scene onto their respective screens,
    the one of said mattes positioned outside the projector in the image projection path to the primary screen masks out the structure, and
    the complementary matte is positioned in the path between the projector and the image on the auxiliary screen to display on the auxiliary screen only that portion of the background scene not appearing on the principal screen, to thereby permit the camera to view the entire background scene as a composite of the reflections from the two screens.

7. Apparatus as defined in claim 1 wherein:
    the two projectors project different images on the respective screens, one image being a modification of a part of the image on the other screen, the pair of complementary mattes in the respective paths between the projectors and the respective screens respectively blocking out of camera view the modified part of the image and its complement, the remainder of the image and, 8. A compact assembly of apparatus for versatile front projection composite photography techniques, comprising in combination:
    a cabinet for housing portions of said assembly arranged to project images in two perpendicular directions,
    two projectors normally disposed within said cabinet, each having a semi-transparent mirror surfaced beam splitter plate which receives and reflects off the mirror surface along the respective said perpendicular directions a projected image, and
    a camera disposed parallel to one of said projectors in said cabinet, having a semi-transparent mirror surfaced beam splitter plate arranged to permit the camera to view through the transparency thereof images positioned along one of said directions and to view through the mirrored surface images positioned along the remaining one of said directions,
    two reflex screens mounted perpendicular to each other to receive images projected along said two perpendicular directions and reflect them back along these directions,
    a pair of complementary mattes mounted on glass plates and positionable at predetermined positions from said respective reflex screens, an stagework positioned in front of one of said reflex screens wherein the stagework is movable in three dimensions to position live action in a desired perspective and scale relationship with the projected images, and to position the live action wholly within the projected image;

and wherein the camera includes means for tilting and panning and means for zooming with respect to the live action and the projected images, without changing the desired relationship between the live action and projected images.

9. The assembly defined in claim 8 including light trap means absorbing projected light passed through the transparency of the respective projector beam splitter plates.

10. The assembly defined in claim 9 including a further camera disposed normally to the first said camera and having a further semi-transparent mirror surfaced beam splitter plate permitting the camera to view through its transparency images along that one of the directions perpendicular to that of the first said camera.

11. The assembly defined in claim 10 including a light source disposed to reflect light off the mirrored surface of the last mentioned beam splitter plate along the direction of view of said further camera.

12. The assembly defined in claim 8 including means varying the depth of the projected scenes and staging in the camera lens to introduce a three dimensional illusionary effect where the staging scene appears to pass behind projected scenery displayed on one of the reflex screens.

13. A composite photography system, comprising:
a primary reflex screen;
a secondary reflex screen smaller than said primary reflex screen and disposed substantially perpendicular thereto;
a stage positionable in front of said primary reflex screen;
a camera arranged to view and receive light from both of said reflex screens;
projection means, including at least one projector and one beam splitter, for projecting scenes onto said reflex screens; and
a primary matte and a secondary matte located between said projection means and said respective reflex screens, and positioned as close as possible to said reflex screens to provide sharp matte lines, but far enough from said reflex screens to permit an actor to pass between a matte and the corresponding reflex screen when necessary for a desired effect, said primary matte being proportioned to matte out all but selected portions of the projected scenes and said secondary matte being proportioned to matte out complementary portions;
wherein an actor on said stage may be placed in a desired perspective and scale relationship with a projected scene, by projecting on said secondary reflex screen portions of the scene that will appear to said camera to be below, above, beside, or surrounding the actor, and other portions that appear to be between the actor and said camera;
and wherein said camera includes means for panning and tilting the camera while still maintaining the desired relationship between the actor and the projected scene.

14. A composite photography system as set forth in claim 13, wherein:
said projection means has only one projector, positioned with its optical axis perpendicular to said secondary reflex screen, has only one beam splitter, disposed between said projector and said secondary reflex screen and angularly positioned to reflect some of the light from said projector onto said primary reflex screen, the remainder passing through said beam splitter, and has a lens disposed between said beam splitter and said secondary reflex screen, to focus the projected scene onto said secondary screen; and
said beam splitter is angularly oriented to reflect light from said secondary reflex screen into said camera, light from said primary reflex screen being also transmitted through said beam splitter to said camera.

15. A method for producing a composite photographic image including at least one actor in a desired perspective and scale relationship with a projected scene, said method comprising the steps of:
projecting a scene from a projector toward a front reflex screen and simultaneously toward a smaller side reflex screen;
reflecting light from the front and side reflex screens into a single camera;
matting the front screen using a first matte placed as close as possible to the front screen while still permitting an actor to pass between the front screen and the first matte when necessary, the first matte being proportioned to permit only selected portions of the projected scene to be reflected to the camera;
placing an actor on a stage before the front screen;
matting the side screen using a second matte, complementary with the first, placed as close as possible to the side screen while still permitting the actor to pass between the side screen and the second matte when necessary, the second matte permitting remaining or complementary portions of the projected scene to be reflected into the camera, the complementary portions being areas of the scene that will appear to be below, above, beside, or surrounding the actor, and areas that will appear to be between the actor and the camera; and
photographing the actor and the image reflected from the two screens, to provide a composite photographic image of the actor placed wholly in the projected scene in the desired perspective and scale relationship; wherein the step of photographing includes panning, tilting and zooming the camera as desired, while still maintaining the desired relationship between the actor and the projected scene.

16. A method as set forth in claim 15, wherein:
said step of matting the front screen mattes out a portion of the projected scene below the actor's feet; and
said step of matting the side screen allows the portion of the projected scene below the actor's feet to be reflected to the camera, creating an illusion that the actor is relatively high in the projected scene.

* * * * *

UNITED STATES PATENT AND TRADEMARK OFFICE
CERTIFICATE OF CORRECTION

PATENT NO. : 5,061,061
DATED : October 29, 1991
INVENTOR(S) : Les P. Robley et al It is certified that error appears in the above-identified patent and that said Letters Patent is hereby corrected as shown below:

Column 2, line 2 change "combines" to --combining--.

Column 7, line 3 change "12 22" to --12, 22--.

Column 10, line 43 after "and," insert -- the camera views a staged scene with part of the background image replaced with an altenate image.--

Column 11, line 1 the "an" should be --a--.

Signed and Sealed this

Thirteenth Day of July, 1993

Attest:

MICHAEL K. KIRK

*Attesting Officer*     *Acting Commissioner of Patents and Trademarks*